(12) United States Patent
Brown et al.

(10) Patent No.: US 7,062,533 B2
(45) Date of Patent: Jun. 13, 2006

(54) SPECIFYING MONITORED USER PARTICIPATION IN MESSAGING SESSIONS

(75) Inventors: Michael Wayne Brown, Georgetown, TX (US); Kelvin Roderick Lawrence, Round Rock, TX (US); Michael A. Paolini, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 844 days.

(21) Appl. No.: 09/956,766

(22) Filed: Sep. 20, 2001

(65) Prior Publication Data

US 2003/0055897 A1  Mar. 20, 2003

(51) Int. Cl.
G06F 15/16 (2006.01)

(52) U.S. Cl. ............................ 709/205; 709/204

(58) Field of Classification Search ............ None
See application file for complete search history.

(56) References Cited

U.S. PATENT DOCUMENTS

| | | | | |
|---|---|---|---|---|
| 4,972,461 A | | 11/1990 | Brown et al. ............. | 379/67 |
| 5,347,306 A | | 9/1994 | Nitta ..................... | 348/15 |
| 5,493,692 A | | 2/1996 | Theimer et al. .......... | 455/26.1 |
| 5,528,745 A | * | 6/1996 | King et al. ............. | 715/753 |
| 5,627,978 A | | 5/1997 | Altom et al. ........... | 395/330 |
| 5,634,129 A | | 5/1997 | Dickinson .............. | 395/683 |
| 5,819,084 A | | 10/1998 | Shapiro et al. .......... | 395/610 |
| 5,861,883 A | | 1/1999 | Cuomo et al. ........... | 345/326 |
| 5,960,173 A | * | 9/1999 | Tang et al. ............. | 709/201 |
| 6,034,683 A | * | 3/2000 | Mansour et al. ......... | 715/764 |
| 6,072,942 A | | 6/2000 | Stockwell et al. ........ | 395/200.36 |
| 6,094,681 A | | 7/2000 | Shaffer et al. ........... | 709/224 |
| 6,105,055 A | * | 8/2000 | Pizano et al. ........... | 709/204 |
| 6,122,663 A | * | 9/2000 | Lin et al. .............. | 709/224 |
| 6,147,977 A | | 11/2000 | Thro et al. ............. | 370/265 |
| 6,212,548 B1 | * | 4/2001 | DeSimone et al. ....... | 709/204 |
| 6,216,165 B1 | | 4/2001 | Woltz et al. ........... | 709/232 |
| 6,411,947 B1 | | 6/2002 | Rice et al. ............. | 706/47 |
| 6,499,053 B1 | * | 12/2002 | Marquette et al. ....... | 709/204 |
| 6,539,421 B1 | * | 3/2003 | Appelman et al. ....... | 709/206 |
| 6,584,493 B1 | * | 6/2003 | Butler ................. | 709/204 |
| 6,606,657 B1 | * | 8/2003 | Zilberstein et al. ...... | 709/224 |

(Continued)

OTHER PUBLICATIONS

IBM Docket AUS920010683US1, Tracking User Availability for Participation in Messaging Sessions, Michael Wayne Brown, et al., 42 pages.

(Continued)

Primary Examiner—John B. Walsh
(74) Attorney, Agent, or Firm—Marilyn Smith Dawkins; Amy J. Pattillo (57) ABSTRACT

A method, system, and program for specifying monitored user participation in a messaging session is provided. A time status for a messaging system element is determined. The time status corresponds to a type of participation by at least one user in a messaging session. An output attribute is assigned to the messaging system element according to the time status, such that output of the messaging system element is specified to depict time status for the messaging session. A client messaging system, receiving the messaging system element with the output attribute, graphically displays the messaging system element in order to graphically reflect user participation in a messaging session.

30 Claims, 6 Drawing Sheets

U.S. PATENT DOCUMENTS

| | | | |
|---|---|---|---|
| 6,640,230 B1 * | 10/2003 | Alexander et al. | 707/10 |
| 6,677,968 B1 * | 1/2004 | Appelman | 715/853 |
| 6,691,162 B1 * | 2/2004 | Wick | 709/224 |
| 6,714,967 B1 | 3/2004 | Horvitz | 709/206 |
| 6,728,754 B1 * | 4/2004 | Lipton | 709/203 |
| 6,754,904 B1 * | 6/2004 | Cooper et al. | 725/32 |
| 6,768,790 B1 | 7/2004 | Manduley et al. | 379/88.13 |
| 2003/0046421 A1 | 3/2003 | Horvitz et al. | |

OTHER PUBLICATIONS

IBM Docket AUS920010649US1, Controlling Throughput of Message Requests in a Messaging System, Michael Wayne Brown, et al., 70 pages.

* cited by examiner

```
                                    ┌── 70
┌─────────────────────────────────────────┐
│         PERSONALIZED USER DIRECTORY     │
├─────────────────────────────────────────┤
│                                         │
│  FRIENDS [%] — 72                       │
│       USER B (10% on-line translucency) — 74
│            TOPIC A (25% translucency) — 76
│            TOPIC B (50% translucency) — 78
│            TOPIC C (25% translucency) — 79
│       USER C (50% away translucency) — 80
│       USER D (25% est. return translucency) — 82
│                                         │
│  GROUP A [&] — 84                       │
│       USER E  #%#$##& — 86              │
│       USER F  T1 T2 — 88                │
│                                         │
│  FAMILY [F] — 92                        │
│       SPOUSE % (10% surfing color) — 94 │
│       CHILD A (50% away color) — 96     │
│       CHILD B %% !! — 98                │
│                                         │
└─────────────────────────────────────────┘
```

FIGURE 4

```
                                    ┌── 100
┌─────────────────────────────────────────────────┐
│         USER TIME STATUS PREFERENCES            │
├─────────────────────────────────────────────────┤
│ MESSAGING      ┌── 102          ┌── 110         │
│ SYSTEM       ┌───────┐        ┌──────────────────┐
│ ELEMENT      │USER J │        │ ON-LINE (color gradient)
│              └───────┘        │ AWAY (translucent)
│                 ┌── 104        │ SURFING (translucent)
│              ┌─────────┐      │ RETURN(color gradient)
│              │ FACTORS │      │ CHAT WITH USER B (!)
│              └─────────┘      │ MULTIPLE SESSIONS (S)
│              ┌─────────┐      └──────────────────┘
│              │ STYLES 106│                       │
│              └─────────┘                         │
│              ┌─────────┐                         │
│              │ WINDOWS 108│                      │
│              └─────────┘                         │
└─────────────────────────────────────────────────┘
```

SPECIFYING MONITORED USER PARTICIPATION IN MESSAGING SESSIONS

CROSS-REFERENCE TO RELATED APPLICATIONS

The present application is related to the following co-pending applications, incorporated herein by reference:
(1) U.S. patent application Ser. No. 09/956,765; and
(1) U.S. patent application Ser. No. 09/957,277 now U.S. Pat. No. 6,938,213.

BACKGROUND OF THE INVENTION

1. Technical Field

The present invention relates in general to electronic communications and, in particular, to specifying outputs indicating user participation. Still more particularly, the present invention relates to specifying output of channel, topic, and user identifiers in messaging sessions to reflect user participation in messaging sessions.

2. Description of the Related Art

As the Internet and telephony expand, the ease of communications between individuals in different locations continues to expand as well. One type of electronic communication is supported by messaging which includes the use of computer systems and data communication equipment to convey messages from one person to another, as by e-mail, voice mail, unified messaging, instant messaging, or fax.

While e-mail has already expanded into nearly every facet of the business world, other types of messaging continue to forge into use. For example, instant messaging systems are typically utilized in the context of an Internet-supported application that transfers text between multiple Internet users in real time.

In particular, the Internet Relay Chat (IRC) service is one example of instant messaging that enables an Internet user to participate in an on-line conversation in real time with other users. An IRC channel, maintained by an IRC server, transmits the text typed by each user who has joined the channel to the other users who have joined the channel. An IRC client shows the names of the currently active channels, enables the user to join a channel, and then displays the other channel participant's words on individual lines so that the user can respond.

Similar to IRC, chat rooms are often available through online services and provide a data communication channel that links computers and permits users to converse by sending text messages to one another in real-time.

Some instant messaging and chat room systems allow a user to maintain a list of preferred users such that when one of those preferred users logs on, the user is notified graphically and/or audibly of the addition. A user may then select to initiate a conversation or participate in an on-going conversation with a logged-on preferred user. However, preferred user lists are limited in that a user is only provided with the log-on status of other users rather than more useful information such as how a user logged on is spending time or how long a user has been logged off.

In addition, another limitation of current messaging systems is that while a user may view a list of current participants in a messaging session, there is no indicator as to which of those participants are most actively participating. Further, a user may view the number of participants in a particular channel, however the number of participants does not indicate the actual rate of participation within each channel.

In view of the foregoing, it would be advantageous to provide a method, system, and program for monitoring user participation in messaging sessions and graphically and audibly notifying users of activity of preferred users including factors such as length of time logged on, length of time logged off, rate of participation in a messaging session, number of channels participating in, and other factors that will aid a user in determining the status of a preferred user. Further, it would be advantageous to provide a method, system, and program for monitoring user participation according to channel and topic such that a graphical indicator of rates of usage according to channel, topic and user is provided.

SUMMARY OF THE INVENTION

In view of the foregoing, it is therefore an object of the present invention to provide an improved method, system and program for performing electronic communications.

It is another object of the present invention to provide a method, system and program for specifying outputs indicating user participation.

It is yet another object of the present invention to provide a method, system and program for specifying output of channel, topic, and user identifiers in messaging sessions to reflect user participation in messaging sessions.

According to one aspect of the present invention, a time status for a messaging system element is determined. The time status corresponds to a type of participation by at least one user in a messaging session. An output attribute is assigned to the messaging system element according to the time status, such that output of the messaging system element is specified to depict time status for the messaging session.

According to another aspect of the present invention, a client messaging system, receiving the messaging system element with the output attribute, graphically displays the messaging system element in order to graphically reflect user participation in a messaging session.

According to still another aspect of the present invention, multiple user participation rates are detected for multiple distinct messaging systems at a client messaging system. The user participation rates are adjusted into a particular output format at the client messaging system. The user participation rates are then graphically displayed in the particular output format, such that display of user participation for the distinct messaging systems is enabled at a client messaging system.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

A method, system and program for specifying monitored participation in a messaging session are provided. A "messaging session" preferably includes, but is not limited to, any combination of voice, graphical, video, and/or text messages, instant and/or delayed, transmitted between multiple users via a network. Messaging sessions may include use of chat rooms, instant messages, e-mail, IRC, conference calling and other network methods of providing a channel for users to communicate within. Further, messaging sessions may include communications such as voice, video, and text transmissions between multiple telephony devices.

In the present invention, "user participation" is advantageously measured according to a time factor and may include, but is not limited to, whether the user is logged on, how long the user has been logged on or logged off, the rate of participation in a messaging session, the number of users with which a user is participating in a messaging session, the types of user with which a user is participating in a messaging session, the number of channels and/or topics a user is participating in, the types of activities other than messaging communication that the user is performing, and other factors that indicate participation in a messaging session.

Further, user participation may be specified for multiple messaging system elements including, but not limited to a channel identifier (ID), a topic ID, a user ID, a message entry, a message window, a channel window, a topic window, a user ID window, a personalized user directory window, and other graphical elements within a messaging system.

In the present invention, "outputs" preferably include, but are not limited to, graphical display output and audible output.

"Output attributes" are characteristics assigned to messaging system elements that specify a manner of output. For example, a graphical attribute may specify the manner in which a messaging system element will be displayed graphically while an audible attribute may specify the manner in which a messaging system element will be audibly output.

Advantageously, in the present invention, a legend or other directions may be provided in order to inform a user of the user participation time factor associated with each output attribute. Alternatively, a user may move a cursor or pointer over a particular messaging session element in graphical form and request the time factor information associated with an output attribute for that messaging session element.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

The present invention may be executed in a variety of systems, including a variety of computing systems and electronic devices under a number of different operating systems. In one embodiment of the present invention, the messaging system is a portable computing system such as a notebook computer, a palmtop computer, a personal digital assistant, a telephone or other electronic computing system that may also incorporate communications features that provide for telephony, enhanced telephony, messaging and information services. However, the messaging system may also be, for example, a desktop computer, a network computer, a midrange computer, a server system or a mainframe computer. Therefore, in general, the present invention is preferably executed in a computer system that performs computing tasks such as manipulating data in storage that is accessible to the computer system. In addition, the computer system preferably includes at least one output device and at least one input device.

Figure 1:
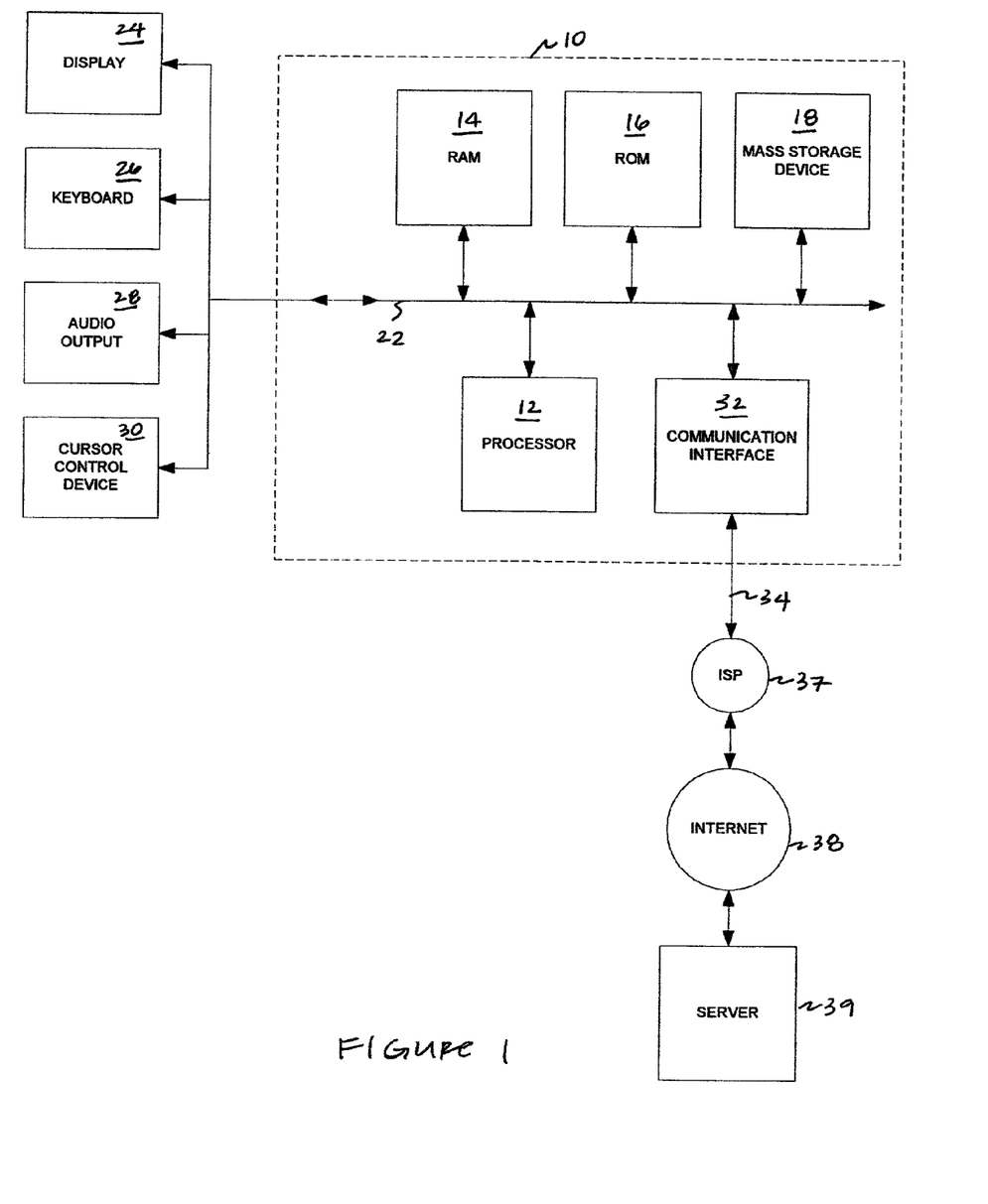
FIG. 1 depicts one embodiment of a computer system with which the method, system and program of the present invention may advantageously be utilized.

Referring now to the drawings and in particular to FIG. 1, there is depicted one embodiment of a computer system with which the method, system and program of the present invention may advantageously be utilized. Computer system 10 comprises a bus 22 or other communication device for communicating information within computer system 10, and at least one processing device such as processor 12, coupled to bus 22 for processing information. Bus 22 preferably includes low-latency and high-latency paths that are connected by bridges and controlled within computer system 10 by multiple bus controllers.

Processor 12 may be a general-purpose processor such as IBM's PowerPC™ processor that, during normal operation, processes data under the control of operating system and application software stored in a dynamic storage device such as random access memory (RAM) 14 and a static storage device such as Read Only Memory (ROM) 16. The operating system preferably provides a graphical user interface (GUI) to the user. In a preferred embodiment, application software contains machine executable instructions that when executed on processor 12 carry out the operations depicted in the flowcharts of FIGS. 7, 8, 9, 10, and others described herein. Alternatively, the steps of the present invention might be performed by specific hardware components that contain hardwire logic for performing the steps, or by any combination of programmed computer components and custom hardware components.

The present invention may be provided as a computer program product, included on a machine-readable medium having stored thereon the machine executable instructions used to program computer system 10 to perform a process according to the present invention. The term "machine-readable medium" as used herein includes any medium that participates in providing instructions to processor 12 or other components of computer system 10 for execution.

Such a medium may take many forms including, but not limited to, non-volatile media, volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patters of holes, a programmable ROM (PROM), an erasable PROM (EPROM), electrically EPROM (EEPROM), a flash memory, any other memory chip or cartridge, or any other medium from which computer system 10 can read and which is suitable for storing instructions. In the present embodiment, an example of nonvolatile media is storage device 18. Volatile media includes dynamic memory such as RAM 14. Transmission media includes coaxial cables, copper wire or fiber optics, including the wires that comprise bus 22. Transmission media can also take the form of acoustic or light waves, such as those generated during radio wave or infrared data communications.

Moreover, the present invention may be downloaded as a computer program product, wherein the program instructions may be transferred from a remote computer such as a server 39 to requesting computer system 10 by way of data signals embodied in a carrier wave or other propagation medium via a network link 34 (e.g., a modem or network connection) to a communications interface 32 coupled to bus 22. Communications interface 32 provides a two-way data communications coupling to network link 34 that may be connected, for example, to a local area network (LAN), wide area network (WAN), or as depicted herein, directly to an Internet Service Provider (ISP) 37. In particular, network link 34 may provide wired and/or wireless network communications to one or more networks.

ISP 37 in turn provides data communication services through the Internet 38 or other network. Internet 38 may refer to the worldwide collection of networks and gateways that use a particular protocol, such as Transmission Control Protocol (TCP) and Internet Protocol (IP), to communicate with one another. ISP 37 and Internet 38 both use electrical, electromagnetic, or optical signals that carry digital data streams. The signals through the various networks and the signals on network link 34 and through communication interface 32, which carry the digital data to and from computer system 10, are exemplary forms of carrier waves transporting the information.

Further, multiple peripheral components may be added to computer system 10. For example, an audio output 28 is attached to bus 22 for controlling audio output through a speaker or other audio projection device. A display 24 is also attached to bus 22 for providing visual, tactile or other graphical representation formats. A keyboard 26 and cursor control device 30, such as a mouse, trackball, or cursor direction keys, are coupled to bus 22 as interfaces for user inputs to computer system 10. In alternate embodiments of the present invention, additional input and output peripheral components may be added.

Messaging Systems Context

Figure 2:
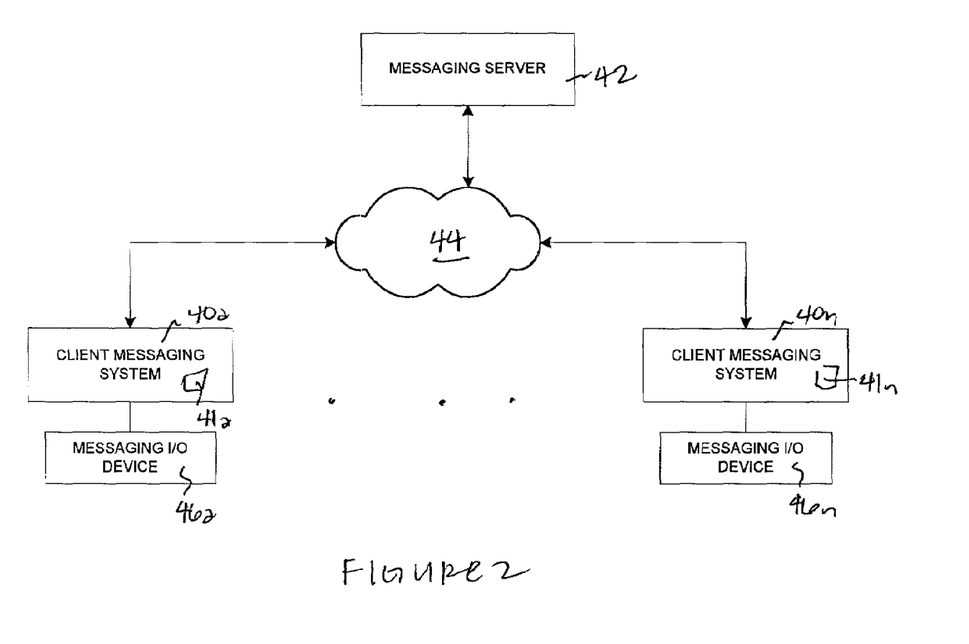
FIG. 2 illustrates a simplified block diagram of a client/server environment in which electronic messaging typically takes place in accordance with the method, system and program of the present invention.

With reference now to FIG. 2, there is depicted a simplified block diagram of a client/server environment in which electronic messaging typically takes place in accordance with the method, system and program of the present invention. The client/server environment is implemented within multiple network architectures. For example, the architecture of the World Wide Web (the Web) follows a traditional client/server modeled environment.

The terms "client" and "server" are used to refer to a computer's general role as a requester of data (the client) or provider of data (the server). In the Web environment, web browsers such as Netscape Navigator typically reside on client messaging systems 40a–40n and render Web documents (pages) served by at least one messaging server such as messaging server 42. Additionally, each of client messaging systems 40a–40n and messaging server 42 may function as both a "client" and a "server" and may be implemented utilizing a computer system such as computer system 10 of FIG. 1. Further, while the present invention is described with emphasis upon messaging server 42 controlling a messaging session, the present invention may also be performed by client messaging systems 40a–40n engaged in peer-to-peer network communications via a network 44.

The Web may refer to the total set of interlinked hypertext documents residing on servers all around the world. Network 44, such as the Internet, provides an infrastructure for transmitting these hypertext documents between client messaging systems 40a–40n and messaging server 42. Documents (pages) on the Web may be written in multiple languages, such as Hypertext Markup Language (HTML) or Extensible Markup Language (XML), and identified by Uniform Resource Indicators (URIs) that specify the particular messaging server 42 and pathname by which a file can be accessed, and then transmitted from messaging server 42 to an end user utilizing a protocol such as Hypertext Transfer Protocol (HTTP). Web pages may further include text, graphic images, movie files, and sounds as well as Java applets and other small embedded software programs that execute when the user activates them by clicking on a link.

Advantageously, in the present invention, a client enters a message via one of messaging input/output (I/O) devices 46a–46n for a messaging session at a client messaging system such as client messaging system 40a. The message entry is transmitted to messaging server 42. Messaging server 42 then distributes the message entry to the users participating in the messaging session via network 44.

In addition, in the present invention, messaging server 42 monitors user participation and specifies output attributes for messaging session elements according to each user's preferences. In particular, each user may designate user time status preferences which indicate the user participation factors and styles associated therewith. Messaging server 42 determines an output attribute according to the current user participation for a factor and adjusts the style to reflect that participation.

While in the present embodiment messaging server 42 handles transmission of message entries and user participation information, in alternate embodiments, user participation information may be accessible to client messaging systems 40a–40n as files in a directory that is accessible to a user. In addition, the user participation information may be transmitted as e-mail to participants in the messaging session. Moreover, the present invention may utilize a traditional IRC channel for transmitting message entries and a special IRC device channel opened in parallel with the traditional IRC channel for transmitting user participation information among users. Furthermore, other types of messaging systems may be utilized to implement the present invention, as will be understood by one skilled in the art.

In addition, while in the present invention user participation information is described with reference to a messaging session, in alternate embodiments, user participation information may be transmitted independent of a messaging session and/or with reference to an alternate application or transmission.

Advantageously, according to one embodiment of the present invention, the steps of entering user time status preferences, controlling transmission of the user time status preferences to messaging server 42, controlling output of messaging session elements with output attributes, and other functions may be performed by an application executing in each of client messaging systems 40a–40n, such as client monitoring applications 41a–41n. Further, client messaging systems 40a–40n may include or receive information from client messaging systems 40a–40n, personal health devices, personal exercise devices, global positioning systems, and other devices that provide personal information about a user that client monitoring applications 41a–41n may provide to messaging server 42 to aid other users in viewing a user participation. For example, where personal exercise information is received, other users may determine that a user is exercising while communicating via one of client messaging systems 40a–40n.

Further, advantageously, a client messaging system may access more than one messaging server 42 at the same time where each messaging server 42 represents an independent messaging system with independent user interfaces and protocols. However, client monitoring applications 41a–41n may advantageously consolidate user participation information for each messaging system into a single format for output to a user, such that the user may view user participation in multiple messaging systems within a single window or other graphical interface.

Figure 3:
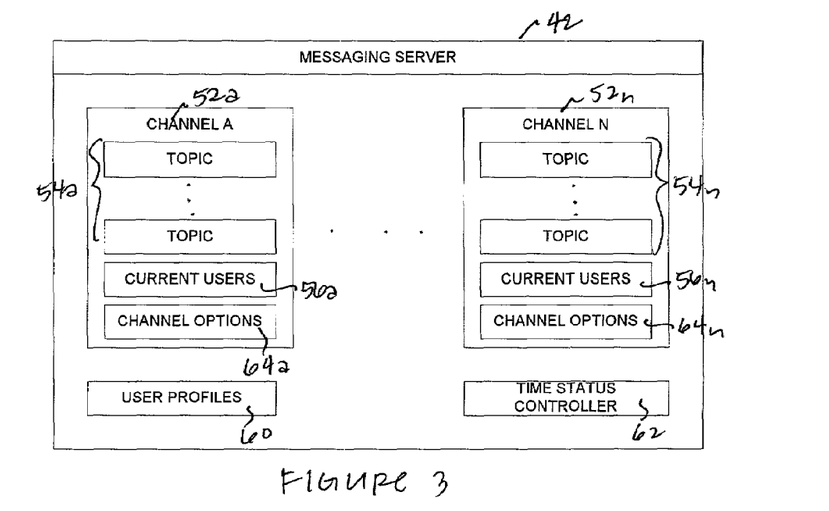
FIG. 3 depicts a block diagram of one embodiment of a messaging server in accordance with the method, system and program of the present invention.

Referring now to FIG. 3, there is illustrated a block diagram of one embodiment of a messaging server in accordance with the method, system and program of the present invention. As depicted, messaging server 42 includes a time status controller 62 that is provided to control the process steps of messaging server 42 as will be further described.

Messaging server 42 also includes multiple channels 52a–52n. Each of channels 52a–52n may represent a separate information path within messaging server 42 in which multiple users may participate in a messaging session. Messaging server 42 may have a defined number of channels 52a–52n or may allow users to create new channels as needed. In particular, channels provide network paths between multiple users for both voice and text communications. Each of channels 52a–52n may further include multiple distinguishable topics, such as topics 54a–54n.

In addition, each of channels 52a–52n preferably includes a table of current users 56a–56n. As a user selects to participate in channels 52a–52n, the user's identification is added to the table of current users 56a–56n for that channel.

Messaging server 42 includes a user profiles database 60 that includes profile information for each user, including, but not limited to, a user identification, user time status preferences, a user history, a user schedule, and current participation recorded as the user participates in messaging sessions. The user identification stored in user profiles 60 during registration is utilized across multiple channels for identifying entries provided by that user.

Time status controller 62 is advantageously a software application executing within messaging server 42 in order to control determination of user participation, specify output attributes for messaging system elements according to the monitored user participation, and distribute the messaging system elements with specified output attributes to multiple client messaging systems according to user preferences for each system.

Channel options are included with each channel as depicted by channel options 64a–64n. Channel options preferably include authorization levels required to receive user participation for a channel. Advantageously, channel options may be selected when a user requests a new channel. Alternatively, a user may select a channel based on the authorization levels set in the channel options for that channel. Moreover, a business or other network service provider may automatically set channel options for channels.

Figure 4:
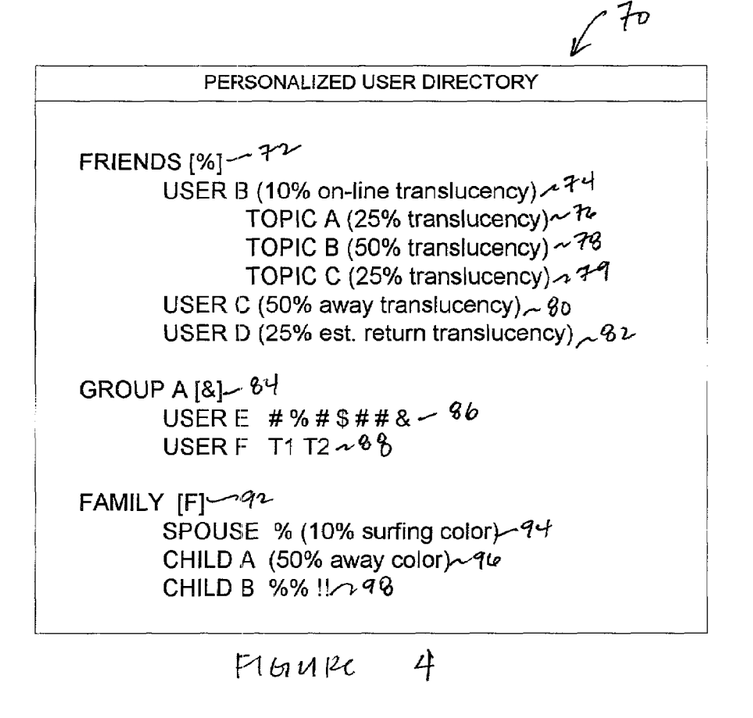
FIG. 4 illustrates a graphical representation of a personalized user directory that may be output within a user interface in accordance with the method, system, and program of the present invention.

Referring now to FIG. 4, there is depicted a graphical representation of a personalized user directory that may be output within a user interface in accordance with the method, system, and program of the present invention. As illustrated in the example, a personalized user directory window 70 contains multiple preferred users grouped by "friends", "groups A", and "family". In alternate embodiments, alternate groups and numbers of groups may be utilized.

As depicted, each of the groups is associated with a symbol as indicated at reference numerals 72, 84, and 92. For example the "%" symbol represents "friends", the "&" symbol represents "groups A", and the "F" symbol represents "family". Advantageously, the group indicator may further be adjusted in translucency or other output attributes in order to indicate user participation by a group of users.

Within "friends", a user has designated a preference to depict time by adjusting the translucency of user indicators B, C, and D. In particular, in adjusting the translucency of user indicators, an area associated with each user indicator may be adjusted in translucency and/or the wording of each user indicator may be adjusted in translucency.

A "friends" group includes users B, C, and D, and graphical output attributes adjusted for each user entry to indicate user participation. First, as illustrated at reference numeral 74, an output attribute for user B has been adjusted to 10% translucency to indicate the amount of time that user B has been on-line. In particular, additional output attributes may be assigned to user B to designate the on-line user participation characteristic.

As depicted at reference numeral 76, an output attribute for user B's participation in subject A has been adjusted to 25% translucency to indicate the rate of user B's participation in subject A. Advantageously, user B's rate of participation in subject A is distinguishable from user B's rate of participation in subjects B and C according to the translucency assigned to subjects B and C, as illustrated at reference numerals 78 and 79. In particular, the translucency of subjects A, B and C may be adjusted with respect to the other in order to compare user participation. Further, as depicted, translucency may be divided between each of the subjects to equal 100% translucency.

As illustrated at reference numeral 80, an output attribute for the amount of time user C has been away has been adjusted to 50% translucency. In particular, translucency percentages may be associated with particular time intervals or ranges. Alternatively, translucency percentages may be determined in comparison with other user participation factors that are depicted.

As depicted at reference numeral 82, an output attribute for the amount of time estimated until user D returns has been adjusted to 25% translucency. Advantageously, a user may provide a time estimate for when the user will be logged on again or the messaging systems may determine an estimate based on a user's schedule and other indicators as described in U.S. patent Ser. No. 09/957,277 now U.S. Pat. No. 6,938,213, herein incorporated by reference.

Within "group A", the user has designated a preference to depict how a user is participating in messaging sessions. For example, as illustrated at reference numeral 86, user E is participating in messaging sessions with users from the groups "friends" and "group A". A "#" symbol indicates a user not in a group defined by the current user. In addition, a "$" symbol indicates participation by the current user. In particular, the symbols may be arranged in the order in which user E begins conversation with each of the users.

As illustrated at reference numeral 88, user F is participating in messaging sessions containing managers about topics "T1" and "T2". In particular, a user may designate to monitor the types of subjects and whether managers are participating in conversations with other users. In the present example, a conversations with managers are assigned a further output attribute of bold type. In alternate embodiments, alternate output attributes may be assigned to represent managers and other types of users.

With the group "family", the user has designated a preference to illustrate with whom a user is participating in messaging sessions and other personalized indicators. For example, as depicted at reference numeral 94, a spouse is participating in a messaging session with a friend and spending time "surfing". Surfing time may describe use of a network connection for activities other than participating in a messaging session. In the example, a particular color is associated with surfing and that color is depicted at 10% to indicate the spouse's participation in surfing activities. Advantageously, an application executing on the client messaging system for the spouse in association with the messaging system monitors the spouse's other computer related and non-computer related activities and reports those activities to the messaging server.

As depicted at reference numeral 96, child A is not logged on as indicated by a particular color, where the shade of that color adjusts to indicate the length of time child A has not been logged on. In the present example, the shade of color is at 50%.

As illustrated at reference numeral 98, child B is logged on and participating in communication with two friends as indicated by the "%" symbol. In addition, child B is communicating with two users who have been flagged as restricted users, as indicated by the "!" symbol. Advantageously, the current user may receive additional warnings that restricted users are being communicated with.

Figure 5:
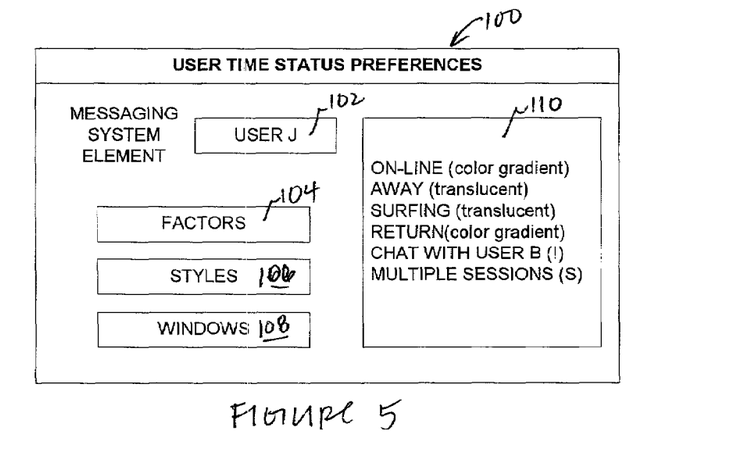
FIG. 5 depicts a graphical representation of a user time status preferences selection window that may be depicted within a user interface in accordance with the method, system, and program of the present invention.

Referring now to FIG. 5, there is illustrated a graphical representation of a user time status preferences selection window that may be depicted within a user interface in accordance with the method, system, and program of the present invention. As depicted, user time status preferences window 100 includes a messaging session element entry area 102 and selectable buttons 104, 106, and 108. In addition, user time status preferences window 100 includes current selections for a user as indicated at reference numeral 110.

A user preferably enters or selects from a directory of user IDs, channel IDs, topic IDs, message entries, windows and other messaging session elements to fill in user ID entry area 102. In the present example, preferences are being selected for user J. To designate preferences for user J, the current user may select to add factors, styles, or windows by selecting from selectable buttons 104, 106, and 108.

In response to a user selection of selectable button 104, another interface allows a user to select from multiple time status factors including, but not limited to, on-line time, off-line time, surfing time, estimated return time, number of sessions participating in, rate of participation in sessions, particular users participating with in sessions, and other measurable and trackable factors that may be described for the current user.

In response to a user selection of selectable button 106, a user may attach a style to a factor where styles may include, but are not limited to, type faces, type sizes, colors, gradients, translucency, transparency, audio, video, graphical enhancements, and other distinguishable graphical and audible output capabilities. In particular, an advantage of styles such as color, gradients, translucency, transparency, and others is that the style is adjustable in response to a time rate or other factor.

In response to a user selection of selectable button 108, a user may designate the type of window in which time status output attributes may be displayed. In particular, an output attribute is determined from the factor and style associated with that window. For example, a user may select for a particular time status output attribute to be output in a personalized user directory. Alternatively, a user may select for another time status output attribute to be output to an independent window as an alert. Further, a user may select for a time status output attribute to be output to a messaging session output window, as depicted in FIG. 6.

Figure 6:
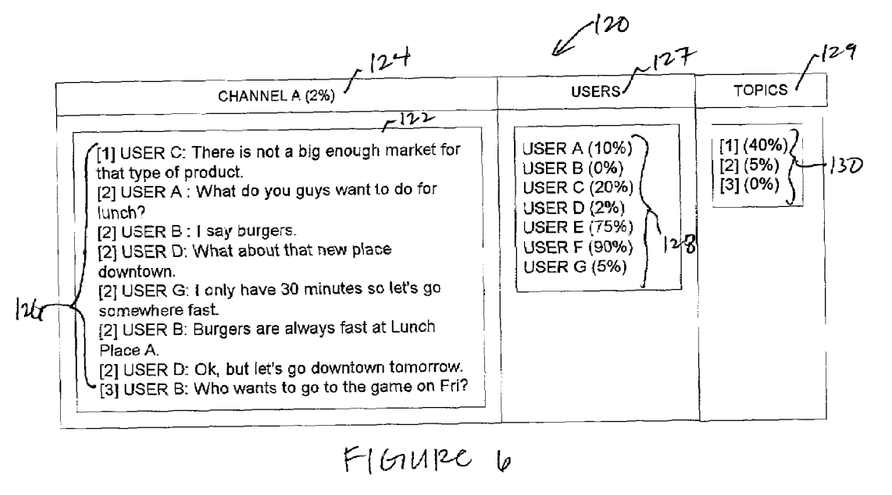
FIG. 6 illustrates a graphical representation of a messaging session window that may be illustrated within a user interface in accordance with the method, system, and program of the present invention.

With reference now to FIG. 6, there is depicted a graphical representation of a messaging session window that may be illustrated within a user interface in accordance with the method, system, and program of the present invention. As illustrated, a messaging session interface 120 contains a messaging session window 122, a users window 127, and a topics window 129.

Messaging session window 122 includes message entries 126, distinguished by user and by topic. In particular, a user ID identifies the user providing each of message entries 126. In addition, a bracketed number indicates the topic associated with each of message entries 126. As described in U.S. patent Ser. No. 09/956,765 other distinguishable attributes may be assigned to distinguish between users and to distinguish between topics. Further, each topic within a channel may be further divided into a window per user and/or per topic.

Messaging session window title bar 124 reflects the rate of participation of all users in channel A. In the present example, the rate of participation is reflected by an adjustment of title bar 124 to 2% translucency. Alternatively, messaging session window 122 or another graphical element associated with messaging session window 122 may be adjusted in translucency to 2% translucency. The rate of participation may be determined according to a rate per unit of time of entries being sent within channel A or may be determined in comparison to the rate of entries in other available channels. Further, other methods of calculating a rate of participation may be utilized. Moreover, in alternate embodiments of the present invention, a separate window may depict the titles of multiple available channels where the titles are graphically distinguished by an output attribute according to a rate of participation in each channel.

Users window 127 includes current users 128. Each of current users 128 in channel A are further graphically distinguished by an output attribute according to a rate of participation in channel A that is indicated by a translucency percentage. For example, users A and B at 10% and 0% translucency are depicted more opaquely when compared to user F at 90% translucency. Advantageously, by adjusting the translucency or other output attribute of each user ID, a current user may easily visibly distinguish which users are most actively participating from those users whose user IDs appear as vanishing from lack of participation. Alternatively, message entries may be adjusted in translucency according to user ID to reflect the output attribute assigned to each user ID.

Topics window 129 includes current topics 130. Each of current topics 130 is further distinguished by an output attribute according to a rate of participation in each topic that is indicated by a translucency percentage. For example, topic "[3]" at 0% translucency is illustrated more opaquely when compared to topic "[1]" at 0%. Advantageously, by adjusting the translucency or other output attribute of each topic, a current user may easily visibly distinguish which topics are most current in participation. Alternatively, topic numbers may be adjusted in translucency within messaging session window 122 to indicate rate of participation in each topic.

Figure 7:
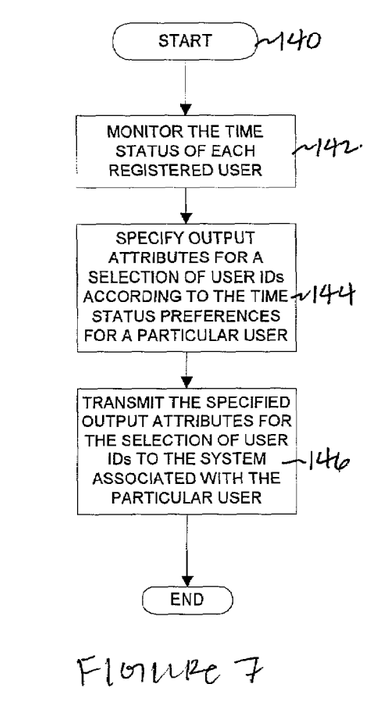
FIG. 7 depicts a high level logic flowchart of a process and program for controlling output attributes for user IDs in accordance with the method, system, and program of the present invention.

Referring now to FIG. 7, there is illustrated a high level logic flowchart of a process and program for controlling output attributes for user IDs in accordance with the method, system, and program of the present invention. As depicted, the process starts at block 140 and thereafter proceeds to block 142. Block 142 illustrates monitoring the time status of each registered user. In particular, monitoring the time status of each registered user includes, but is not limited to, monitoring entries by each user according to channel and topic, monitoring on-line, off-line and inactivity, and other criteria that has been designated by users as monitoring factor preferences.

Next, block 144 depicts specifying output attributes for a selection of user IDs according to the time status preferences for a particular user. In particular, output attributes may include the graphical and audible attribute to be associated with each user ID or may include a value measured for a particular factor that will be utilized by the client messaging system to assign a particular graphical or audible attribute. Thereafter, block 146 illustrates transmitting the specified output attributes for the selection of user IDs to the system associated with the particular user, and the process ends.

Figure 8:
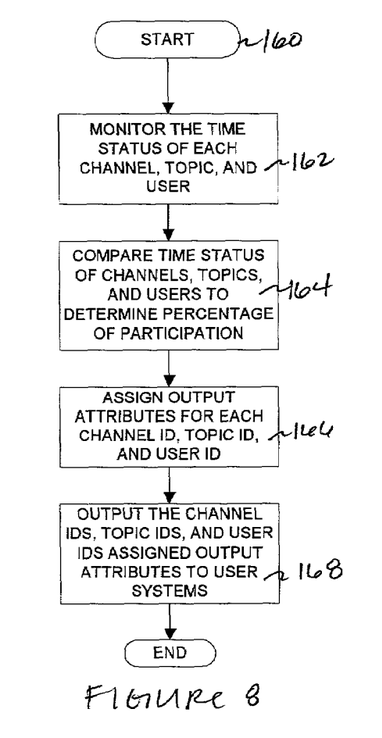
FIG. 8 illustrates a high level logic flowchart of a process and program for controlling output attributes for channels and topics in accordance with the method, system, and program of the present invention.

With reference now to FIG. 8, there is depicted a high level logic flowchart of a process and program for controlling output attributes for channels and topics in accordance with the method, system, and program of the present invention. As illustrated, the process starts at block 160 and thereafter proceeds to block 162.

Block 162 illustrates monitoring the time status of each available channel and then each user and topic within each channel. Next, block 164 depicts comparing the time status of the monitored channels, users and topics in order to divide a rate of participation among the available channels, users, and topics. Thereafter, block 166 illustrates assigning output attributes for each channel, user and topic. Finally, block 168 depicts outputting the channels, users and topics with output attributes to users systems according to current user output selections, and the process ends. For example, if a user has a window displaying all channels and then channels A and C open, the channel, user and topics utilized within those windows will be output to that user system.

Figure 9:
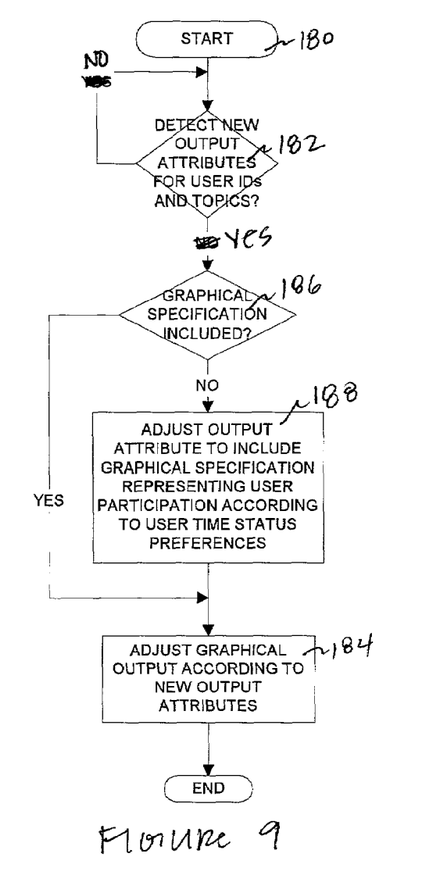
FIG. 9 depicts a high level logic flowchart of a process and program for controlling graphical output at a client messaging system in accordance with the method, system, and program of the present invention.

Referring now to FIG. 9, there is illustrated a high level logic flowchart of a process and program for controlling graphical output at a client messaging system in accordance with the method, system, and program of the present invention. As depicted, the process starts at block 180 and thereafter proceeds to block 182.

Block 182 illustrates a determination as to whether or not new output attributes are detected for channels, user IDs, and topics. If no new output attributes are detected, then the process iterates at block 182. If new output attributes are detected, then the process passes to block 186.

Block 186 depicts a determination as to whether the output attribute includes a graphical specification. If the output attribute includes a graphical specification, then the process passes to block 184. Otherwise, if the output attribute just includes a time value, then the process passes to block 188. Block 188 illustrates adjusting the output attribute to include a graphical representation for the time value according to user time status preferences, and the process passes to block 184.

Block 184 depicts adjusting the graphical and audible output according to the new output attributes and the user time status preferences, and the process ends. In particular, the output attributes may include graphical and audible specifications or may include a value for a particular factor such that a graphical or audible specification is determined by the client messaging system according to the user time status preferences.

Figure 10:
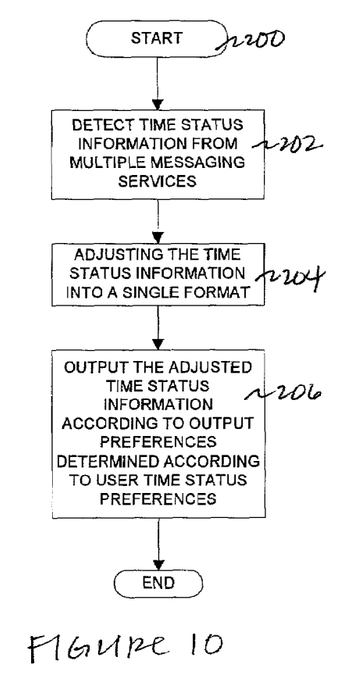
FIG. 10 illustrates a high level logic flowchart of a process and program for monitoring multiple messaging services in accordance with the method, system, and program of the present invention.

With reference now to FIG. 10, there is depicted a high level logic flowchart of a process and program for monitoring multiple messaging services in accordance with the method, system, and program of the present invention. As illustrated, the process starts at block 200 and thereafter proceeds to block 202. Block 202 depicts detecting the time status information from multiple messaging services. In detecting the time status information from multiple messaging services, the client messaging system may monitor messaging systems being participated in by the user or may receive monitored information from the messaging systems such that time status information is detected for multiple diverse messaging systems.

Next, block 204 illustrates adjusting the time status information into a single, cohesive format. Thereafter, block 206 depicts outputting the adjusted time status according to user preferences, such that a user may monitor time status information across multiple diverse messaging systems; and the process ends.

While the invention has been particularly shown and described with reference to a preferred embodiment, it will be understood by those skilled in the art that various changes in form and detail may be made therein without departing from the spirit and scope of the invention.

What is claimed is:

1. A method, in at least one server system for enabling at least one messaging session via a network between a plurality of client systems communicatively connected to said network, for specifying output of monitored user participation in said messaging session, said method comprising the steps of:

monitoring, at said server system, a time status for at least one first user logged on at at least one first client system from among said plurality of client systems, wherein said time status comprises at least one from among a period of time said first user has been logged on at said first client system, a period of time said first user has remained inactive from participation in said messaging session while logged on at said first client system, and a period of time said first user has participated in said messaging session;

assigning, at said server system, a separate output attribute from among a plurality of distinct graphical output attributes to represent said time status for output to each of a plurality of other users at a selection of said plurality of client systems according to each separate output preference from among a plurality of distinct graphical output attributes for each of said plurality of other users; and transmitting, from said server system, each said separate output attribute to each of said selection of said plurality of client systems for specifying at least one graphical output attribute of an online representation of said first user within a separate user interface at each of said selection of said plurality of client systems.

2. The method for specifying output of monitored user participation according to claim 1, said step of monitoring, at said server system, a time status for at least one first user further comprising the step of:

determining said time status, wherein said time status further comprises at least one from among a rate of participation by said first user in at least one messaging session, an estimated time for said first user to return to participation in said messaging session, and a time said first user interacts in a web browser window while logged on at said first client system.

3. The method for specifying output of monitored user participation according to claim 1, further comprising the step of:

assigning a time value for specifying output of said online representation of said first user to represent said time status, wherein each of said selection of said plurality of client systems receiving said time value is enabled to utilize said time value to assign a separate graphical output specification for said online representation of said first user.

4. The method for specifying output of monitored user participation according to claim 1, said step of assigning, at said server system, a separate output attribute from among a plurality of distinct graphical output attributes to represent said time status further comprising the step of:

assigning each said separate output attribute as a particular level of transparency to represent said time status according to each said separate output preference for each of said plurality of other users.

5. A system for specifying output of monitored user participation in a messaging session, said system comprising:

a server system communicatively connected to a network for enabling at least one messaging session via said network between a plurality of client systems communicatively connected to said network;

said server system further comprising:

means for monitoring a time status for a at least one first user logged on at at least one first client system from among said plurality of client systems, wherein said time status comprises at least one from among a period of time said first user has been logged on at said first client system, a period of time said first user has remained inactive from participation in said messaging session while logged on at said first client system, and a period of time said first user has participated in said messaging session;

means for assigning a separate output attribute from among a plurality of distinct graphical output attributes to represent said time status for output to each of a plurality of other users at a selection of said plurality of client systems according to each separate output preference from among a plurality of distinct graphical output attributes for each of said plurality of other users; and means for transmitting each said separate output attribute to each of said selection of said plurality of client systems for specifying at least one graphical output attribute of an online representation of said first user within a separate user interface at each of said selection of said plurality of client systems.

6. The system for specifying output of monitored user participation according to claim 5, said means for monitoring a time status for at least one first user further comprising:

means for determining said time status, wherein said time status further comprises at least one from among a rate of participation by said first user in at least one messaging session, an estimated time for said first user to return to participation in said messaging session, and a time said first user interacts in a web browser window while logged on at said first client system.

7. The system for specifying output of monitored user participation according to claim 5, said means for assigning a separate output attribute from among a plurality of distinct graphical output attributes to represent said time status from among a plurality of distinctive output attributes further comprising:

means for assigning said separate output attribute as a particular level of transparency to represent said time status according to each said separate output preference for each of said plurality of other users.

8. The system for specifying output of monitored user participation according to claim 5, said server system further comprising:

means for assigning a time value for specifying output of said online representation of said first user to represent said time status, wherein each of said selection of said plurality of client systems receiving said time value is enabled to utilize said time value to assign a separate graphical output specification for said online representation of said first user.

9. A program for specifying output of monitored user participation in a messaging session, residing on a computer usable medium having computer readable program code means, said program comprising:

means for monitoring a time status for a at least one first user logged on at at least one first client system from among said plurality of client systems, wherein said time status comprises at least one from among a period of time said first user has been logged on at said first client system, a period of time said first user has remained inactive from participation in said messaging session while logged on at said first client system, and a period of time said first user has participated in said messaging session;

means for assigning a separate output attribute from among a plurality of distinct graphical output attributes to represent said time status for output to each of a plurality of other users at a selection of said plurality of client systems according to each separate output preference from among a plurality of distinct graphical output attributes for each of said plurality of other users; and means for controlling transmission of each said separate output attribute to each of said selection of said plurality of client systems for specifying at least one graphical output attribute of an online representation of said first user within a separate user interface at each of said selection of said plurality of client systems.

10. The program for specifying output of monitored user participation according to claim 9, said program further comprising:

means for determining said time status, wherein said time status further comprises at least one from among a rate of participation by said first user in at least one messaging session, an estimated time for said first user to return to participation in said messaging session, and a time said first user interacts in a web browser window while logged on at said first client system.

11. The program for specifying output of monitored user participation according to claim 9, said program farther comprising:

means for assigning each said separate output attribute as a particular level of transparency to represent said time status according to each said separate output preference for each of said plurality of other users.

12. The program for specifying output of monitored user participation according to claim 9, said program further comprising:

means for assigning a time value for specifying output of said online representation of said first user to represent said time status, wherein each of said selection of said plurality of client systems receiving said time value is enabled to utilize said time value to said assign a separate graphical output specification for said online representation of said first user.

13. A method for reflecting user participation in at least one messaging session, said method comprising the steps of:

receiving, at a particular client system from among a plurality of client systems communicatively connected via a network to a chat server enabled to facilitate said messaging session, an output attribute from among a plurality of distinct graphical output attributes assigned by said chat server in association with an online representation of at least one other user logged on to said chat server according to output preferences of a particular user logged in at said particular client system, wherein said output attribute represents a time status comprising at least one from among a period of time said other user has been logged on at another client system, a period of time said other user has remained inactive from participation in said messaging session while logged on at said another system, and a period of time said other user has participated in said messaging session; and adjusting, by said particular client system, a graphical output of said online representation of said at least one other user in said user interface according to said output attribute, such that said user interface is adjusted to reflect said user participation by said at least one other user in said messaging session as directed by said chat server according to output preferences of said particular user.

14. The method for reflecting user participation according to claim 13, said method further comprising the step of:
receiving said output attribute set to a particular level of transparency to represent said time status of said other user as specified by said chat server according to said output preference for said particular user.

15. The method for reflecting user participation according to claim 13, said method further comprising the step of:
adjusting a plurality of other messaging session elements within said user interface, in response to said adjustment of said online representation of said at least one other user according to said output attribute.

16. A system for reflecting user participation in at least one messaging session, said system comprising:
a user system communicatively connected to a network for accessing a chat server enabled to facilitate said messaging session between a plurality of user systems;
said user system further comprising:
means for receiving an output attribute from among a plurality of distinct graphical output attributes assigned by said chat server in association with an online representation of at least one other user logged on to said chat server according to output preferences of a particular user logged in at said user system, wherein said output attribute represents a time status comprising at least one from among a period of time said other user has been logged on at another client system, a period of time said other user has remained inactive from participation in said messaging session while logged on at said another system, and a period of time said other user has participated in said messaging session; and
means for adjusting a graphical output of said online representation of said at least one other user in said user interface according to said output attribute, such that said user interface is adjusted to reflect said user participation by said at least one other user in said messaging session as directed by said chat server according to output preferences of said particular user.

17. The system for reflecting user participation according to claim 16, said user system further comprising:
receiving said output attribute set to a particular level of transparency to represent said time status of said other user as specified by said chat server according to said output preference for said particular user.

18. The system for reflecting user participation according to claim 16, said user system further comprising:
means for adjusting a plurality of other messaging session elements within said user interface, in response to said adjustment of said online representation of said at least one other user according to said output attribute.

19. A program for reflecting user participation in at least one messaging session, residing on a tangible computer usable medium having computer readable program code means, said program comprising:
means for receiving an output attribute from among a plurality of distinct graphical output attributes assigned by a chat server in association with an online representation of at least one other user logged on to said chat server according to output preferences of a particular user, wherein said output attribute represents a time status comprising at least one from among a period of time said other user has been logged on at another client system, a period of time said other user has remained inactive from participation in said messaging session while logged on at said another system, and a period of time said other user has participated in said messaging session; and
means for controlling adjustment of a graphical output of said online representation of said at least one other user in said user interface according to said output attribute, such that said user interface is adjusted to reflect said user participation by said at least one other user in said messaging session.

20. The program for reflecting user participation according to claim 19, said program further comprising:
means for receiving said output attribute set to a particular level of transparency to represent said time status of said other user as specified by said chat server according to said output preference for said particular user.

21. The program for reflecting user participation according to claim 19, said program further comprising:
means for controlling adjustment of a plurality of other messaging session elements within said user interface, in response to said adjustment of said online representation of said at least one other user according to said output attribute.

22. A method for reflecting user participation in a plurality of distinct messaging systems, said method comprising the steps of:
detecting, at a client messaging system logged onto by a first user and communicatively connected via a network to a plurality of distinct messaging service systems, a plurality of separate user participation rates from said plurality of distinct messaging service systems, wherein each of said plurality of separate user participation rates specifies a time period of participation by at least one other user participating in at least one from among a plurality of chat sessions each separately facilitated by one from among said plurality of distinct messaging service systems, wherein each of said plurality of distinct messaging service systems distributes user participation rates in a separate format from among a plurality of distinct formats;
adjusting each separate user participation rate in one from among said plurality of distinct formats into a particular output format at said client messaging system; and
graphically displaying each separate user participation rate in said particular output format, such that display of user participation for said plurality of distinct messaging service systems is enabled at a client messaging system.

23. The method for reflecting user participation in a plurality of distinct messaging systems according to claim 22, said step of detecting a plurality of separate user participation rates further comprising the step of:
detecting each of said plurality of separate user participation rates by receiving a plurality of graphical output attributes each assigned to at least one other user, wherein said plurality of output attributes each represent one from among said plurality of user participation rates.

24. The method for reflecting user participation in a plurality of distinct messaging systems according to claim 22, said step of graphically displaying each separate user participation rate in said particular output format, further comprising the step of:
graphically displaying said plurality of separate user participation rates according user preferences for said first user logged onto said plurality of distinct messaging service systems via said client messaging system.

25. A system for reflecting user participation in a plurality of distinct messaging systems, said system comprising:
a client messaging system communicatively connected via a network to a plurality of distinct messaging service systems, wherein a first user logs onto said plurality of distinct messaging server systems via said client messaging system;
said client messaging system further comprising:
means for detecting a plurality of separate user participation rates from said plurality of distinct messaging service systems, wherein each of said plurality of separate user participation rates specifies a time period of participation by at least one other user participating in at least one from among a plurality of chat sessions each separately facilitated by one from among said plurality of distinct messaging service systems, wherein each of said plurality of distinct messaging service systems distributes user participation rates in a separate format from among a plurality of distinct formats;
means for adjusting each separate user participation rate detected in one from among said plurality of distinct formats into a particular output format; and
means for graphically displaying each separate user participation rate in said particular output format.

26. The system for reflecting user participation in a plurality of distinct messaging systems according to claim 25, said means for detecting a plurality of separate user participation rates further comprising:
means for detecting each of said plurality of separate user participation rates by receiving a plurality of graphical output attributes each assigned to at least one other user, wherein said plurality of output attributes each represent one from among said plurality of user participation rates.

27. The system for reflecting user participation in a plurality of distinct messaging systems according to claim 25, said means for graphically displaying each separate user participation rate in said particular output format, further comprising:
means for graphically displaying said plurality of separate user participation rates according user preferences for said first user utilizing said client messaging system.

28. A program for reflecting user participation in a plurality of distinct messaging systems, residing on a computer usable medium having computer readable program code means, said program comprising:
means for detecting a plurality of separate user participation rates from a plurality of distinct messaging service systems, wherein each of said plurality of separate user participation rates specifies a time period of participation by at least one other user participating in at least one from among a plurality of chat sessions each separately facilitated by one from among said plurality of distinct messaging service systems, wherein each of said plurality of distinct messaging service systems distributes user participation rates in a separate format from among a plurality of distinct formats;
means for adjusting each separate user participation rate in one from among said plurality of distinct formats into a particular output format; and
means for enabling graphical display of each separate user participation rate in said particular output format.

29. The program for reflecting user participation in a plurality of distinct messaging systems according to claim 28, said program further comprising:
means for detecting each of said plurality of separate user participation rates by receiving a plurality of graphical output attributes each assigned to at least one other user, wherein said plurality of output attributes each represent one from among said plurality of user participation rates.

30. The system for reflecting user participation in a plurality of distinct messaging systems according to claim 28, said program further comprising:
means for enabling a graphical display of said plurality of separate user participation rates according user preferences for said first user.

* * * * *